United States Patent
Allen-Ware et al.

(10) Patent No.: US 8,909,954 B2
(45) Date of Patent: Dec. 9, 2014

(54) BRANCH CIRCUIT POWER MEASUREMENT AND DYNAMIC POWER DISTRIBUTION

(75) Inventors: Malcolm S. Allen-Ware, Austin, TX (US); Thomas M. Brey, Cary, NC (US); Wael R. El-Essawy, Austin, TX (US); Alexandre P. Ferreira, Austin, TX (US); Thomas W. Keller, Jr., Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 283 days.

(21) Appl. No.: 13/590,733

(22) Filed: Aug. 21, 2012

(65) Prior Publication Data

US 2013/0054985 A1    Feb. 28, 2013

Related U.S. Application Data

(63) Continuation of application No. 13/215,565, filed on Aug. 23, 2011, now abandoned.

(51) Int. Cl.
*G06F 1/00* (2006.01)
*G06F 1/32* (2006.01)

(52) U.S. Cl.
CPC .................................. *G06F 1/3206* (2013.01)
USPC ............................ 713/300; 700/295; 700/297

(58) Field of Classification Search
USPC .................................. 713/300; 700/295, 297
See application file for complete search history.

(56) References Cited

U.S. PATENT DOCUMENTS

| | | |
|---|---|---|
| 6,330,516 B1 | 12/2001 | Kammeter |
| 6,804,616 B2 | 10/2004 | Bodas |
| 6,870,387 B2 | 3/2005 | Huang et al. |
| 6,968,470 B2 | 11/2005 | Larson et al. |
| 6,986,069 B2 | 1/2006 | Oehler et al. |
| 7,095,324 B2 | 8/2006 | Conwell et al. |
| 7,210,048 B2 | 4/2007 | Bodas |
| 7,307,529 B2 | 12/2007 | Gutnik et al. |
| 7,353,410 B2 | 4/2008 | Desai et al. |
| 7,363,516 B2 | 4/2008 | Bresniker et al. |
| 7,444,526 B2 | 10/2008 | Felter et al. |

(Continued)

OTHER PUBLICATIONS

International Search Report and Written Opinion dated May 11, 2011 in International Application No. PCT/EP2011/050070, 7 pages.

(Continued)

*Primary Examiner* — Jaweed A Abbaszadeh
(74) *Attorney, Agent, or Firm* — Francis Lammes; Stephen J. Walder, Jr.; Parashos T. Kalaitzis (57) ABSTRACT

A mechanism is provided for dynamically changing power caps for a set of powered elements. Current being consumed by the set of powered elements P on a branch circuit is measured and available current on the branch circuit is determined. A new total power cap for a current time period t is identified based on a current total power cap and the measured current. A difference in total power caps ($\Delta TPC$) is determined and, for each powered element p in the set of powered elements P at the current time period, a new power cap PC (p,t) is determined based on the previous power cap PC(p,t−1) and the difference of the total power caps to the set of powered elements P. A power cap of each powered element p is then dynamically set to the new power cap PC (p,t).

24 Claims, 5 Drawing Sheets

(56) References Cited

U.S. PATENT DOCUMENTS

| | | |
|---|---|---|
| 7,539,881 B2 * | 5/2009 | Shaw et al. .................... 713/300 |
| 7,747,354 B2 | 6/2010 | Papallo et al. |
| 7,865,272 B2 | 1/2011 | Spitaels et al. |
| 7,895,455 B2 | 2/2011 | Green et al. |
| 8,006,108 B2 * | 8/2011 | Brey et al. .................... 713/320 |
| 8,132,034 B2 | 3/2012 | Lambert et al. |
| 8,352,757 B2 | 1/2013 | Egan et al. |
| 8,519,843 B2 | 8/2013 | El-Essawy et al. |
| 8,713,297 B2 * | 4/2014 | McCarthy ........................ 713/1 |
| 2006/0133175 A1 | 6/2006 | Gutnik et al. |
| 2006/0206730 A1 | 9/2006 | Cartes et al. |
| 2007/0010916 A1 | 1/2007 | Rodgers et al. |
| 2008/0030078 A1 | 2/2008 | Whitted et al. |
| 2008/0189700 A1 | 8/2008 | Schmidt et al. |
| 2008/0320322 A1 | 12/2008 | Green et al. |
| 2009/0125737 A1 | 5/2009 | Brey et al. |
| 2009/0271725 A1 | 10/2009 | Dirla |
| 2010/0235654 A1 | 9/2010 | Malik |
| 2011/0144818 A1 | 6/2011 | Li et al. |
| 2011/0173461 A1 | 7/2011 | Felter et al. |
| 2011/0173468 A1 | 7/2011 | Egan et al. |
| 2012/0078430 A1 * | 3/2012 | Fan et al. ...................... 700/295 |
| 2012/0210145 A1 | 8/2012 | Felter et al. |

OTHER PUBLICATIONS

U.S. Appl. No. 12/685,928.
U.S. Appl. No. 12/686,008.
U.S. Appl. No. 13/215,565.
U.S. Appl. No. 13/451,181.
U.S. Appl. No. 13/453,566.
Pelley, Steven et al., "Power Routing: Dynamic Power Provisioning in the Data Center", ASPLOS'10, Version 45, No. 3, Pittsburgh PA, Mar. 13-17, 2010, pp. 231-242.
Wang, Xiaorui et al., "SHIP: Scalable Hierarchical Power Control for Large-Scale Data Centers", PACT'09 Proceedings of the 2009 18th International Conference on Parallel Architectures and Compilation Techniques, Raleigh, NC, Sep. 12-16, 2009, 10 pages.

* cited by examiner

BRANCH CIRCUIT POWER MEASUREMENT AND DYNAMIC POWER DISTRIBUTION

BACKGROUND

The present application relates generally to an improved data processing apparatus and method and more specifically to mechanisms for measuring branch circuit power and performing dynamic power distribution.

Information technology (IT) equipment is required to indicate its power consumption (rating). The rating is used to determine appropriate electrical wiring based on the electrical code. The manufacturer affixes labels to equipment specifying the power rating information, which may include maximum (peak) current, maximum combined wattage, continuous power, or the like. The power consumption of IT equipment depends on the configuration of the equipment and the workload that the equipment runs. To stay within limits, manufacturers rate the equipment for "worst case" conditions (e.g., 35° C., high altitude, etc.), maximum configuration (e.g., processor sockets full, all drive bays full, all expansion card slots occupied, all memory slots occupied, etc.), and extreme workloads (e.g., linear algebra functions, power virus, etc.). Data center and IT operators request an amount of power from the power company based on the power rating of the equipment. However, computer equipment seldom uses the amount of power indicated by the manufacturer's power rating, which results in unnecessary capital investments that impede IT growth.

SUMMARY

In one illustrative embodiment, a method, in a data processing system, is provided for dynamically changing power caps for a set of powered elements. The illustrative embodiment measures current being consumed by the set of powered elements P on a branch circuit. The illustrative embodiment determines available current on the branch circuit. The illustrative embodiment identifies a new total power cap for a current time period t based on a current total power cap and the measured current. The illustrative embodiment determines a difference in total power caps ($\Delta TPC$) and, for each powered element p in the set of powered elements P at the current time period, the illustrative embodiment determines a new power cap PC (p,t) based on the previous power cap PC(p,t−1) and the difference of the total power caps to the set of powered elements P. The illustrative embodiment then dynamically sets a power cap of each powered element p to the new power cap PC (p,t).

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

While previous work proposes the use of power capping to remove the requirement of sizing each branch with 100% of the load, allowing the use of up to 50% more equipment on the same circuit, power capping limits the maximum performance of powered elements, which would improve if an associated power cap would increase. Further, since some powered elements utilizing a branch circuit may never reach associated power caps, a dynamic pool of unused power capacity may be readily available to other powered elements utilizing the same branch circuit.

Thus, the illustrative embodiments provide a mechanism for dynamically changing power caps of powered elements so the average current consumed for the servers is at most 80 percent of the branch circuit current (BCC) associated with the powered elements. A power and current measurement system (PCMS) uses the real-time current measurement in each branch circuit to compute new power caps for the powered elements associated with that branch circuit. The PCMS updates the power cap for each powered element using, for example, operating system level management applications, service processors, or the like, over, for example, an information technology network, a power line communications system, or the like. The illustrative embodiments may be fault-tolerant to a PCMS failure by defaulting a powered element to a power cap to 66 percent of maximum power rating of the powered element in the event of the powered element fails to receive a periodic power cap update within a predetermined time interval as well as never allocating power caps that together use more than 125 percent of the branch circuit capacity (BCC). That is, the illustrative embodiments assume that the maximum power rating associated with the powered element provides a power cap range for the powered element that is safe to use and enforceable.

Figure 1:
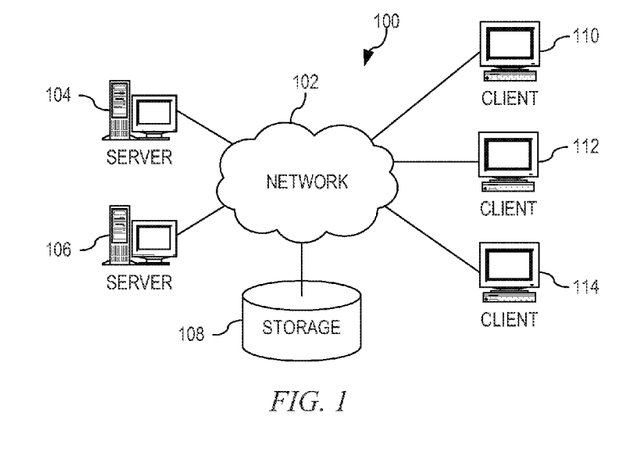
FIG. 1 depicts a pictorial representation of an example distributed data processing system in which aspects of the illustrative embodiments may be implemented.
Figure 2:
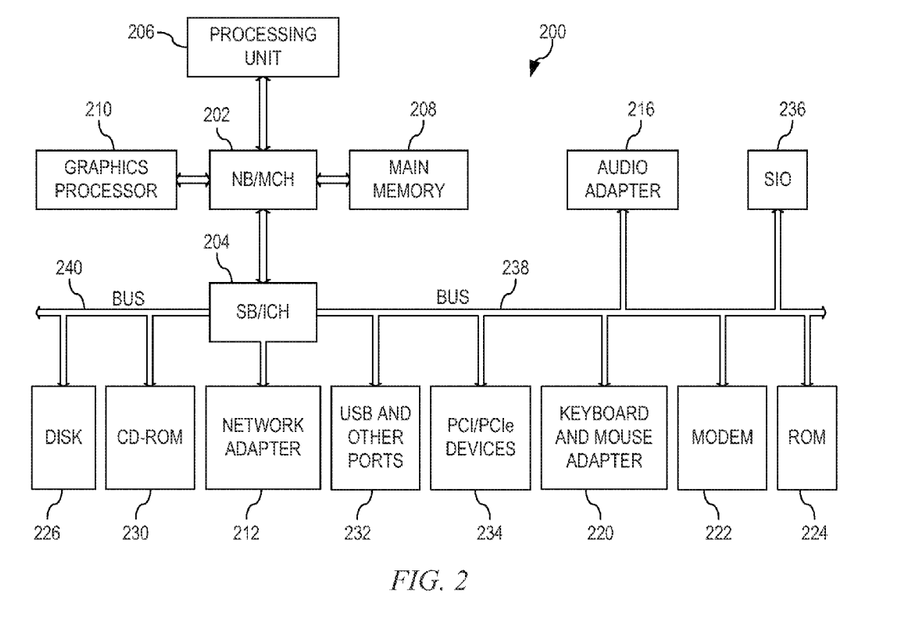
FIG. 2 shows a block diagram of an example data processing system in which aspects of the illustrative embodiments may be implemented.

Thus, the illustrative embodiments may be utilized in many different types of data processing environments including a distributed data processing environment, a single data processing device, or the like. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1-2 are only examples and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along, with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

With reference now to FIG. 2, a block diagram of an example data processing system is shown in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/MCH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft Windows 7 (Microsoft and Windows are trademarks of Microsoft Corporation in the United States, other countries, or both). An object-oriented programming system, such as the Java programming system, may run in conjunction with the operating system and provides calls to the operating system from Java programs or applications executing on data processing system 200 (Java is a trademark of Oracle and/or its affiliates.).

As a server, data processing system 200 may be, for example, an IBM® eServer™ System p® computer system, running the Advanced Interactive Executive (AIX®) operating system or the LIMA operating system (IBM, eServer, System p, and AIX are trademarks of International Business Machines Corporation in the United States, other countries, or both, and LINUX is a registered trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

Again, the illustrative embodiments provide a mechanism for dynamically changing power caps of powered elements so the average current consumed for the servers is at most 80 percent of the branch circuit current (BCC) associated with the powered elements. A power and current measurement system (PCMS) uses the real-time current measurement in each branch circuit to compute new power caps for the powered elements associated with that branch circuit. The PCMS updates the power cap for each powered element using, for example, operating system level management applications, service processors, or the like, over, for example, an information technology network, a power line communications system, or the like.

Figure 3:
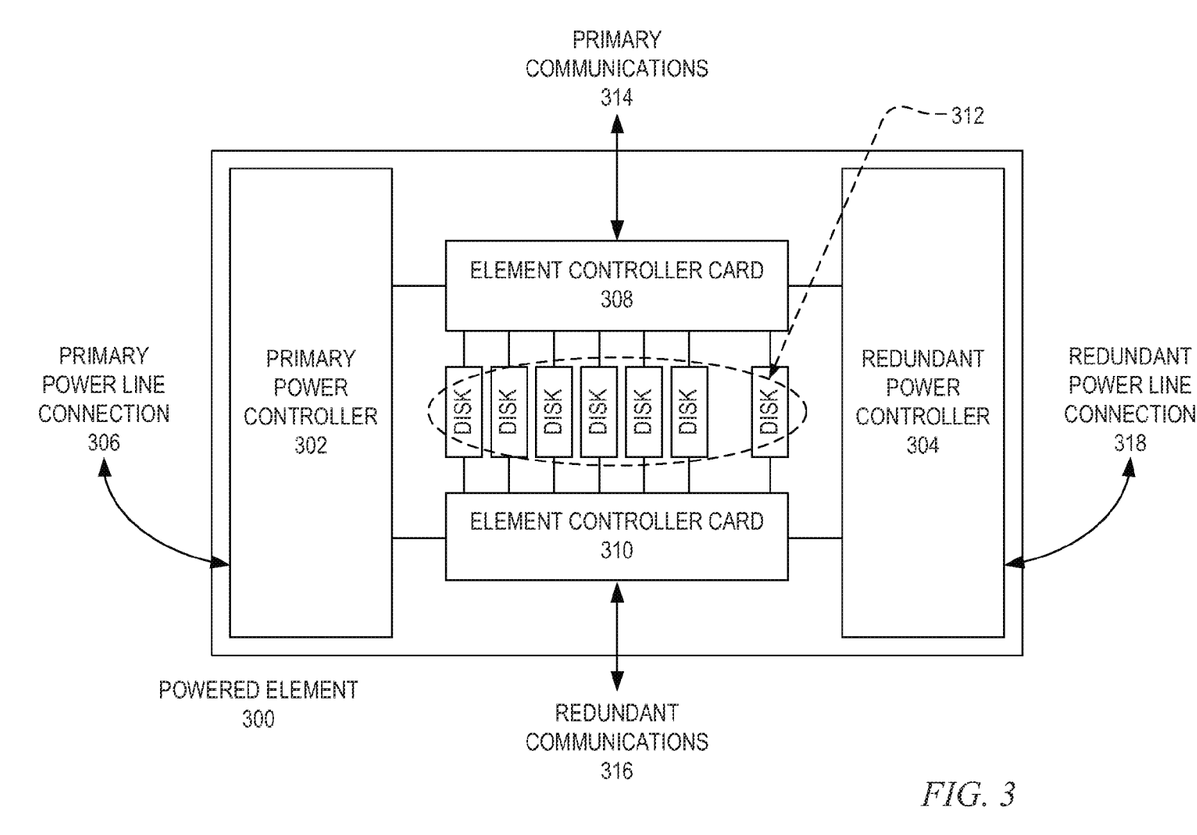
FIG. 3 depicts an exemplary powered element that receives power from a power controller in accordance with an illustrative embodiment.

FIG. 3 depicts an exemplary powered element that receives power from a power controller in accordance with an illustrative embodiment. Powered element 300 includes primary power controller 302 and redundant power controller 304. Primary power controller 302 receives power from a primary power supply of a power distribution device over primary power line connection 306. Primary power controller 302 then provides power to devices within powered element 300, such as element controller card 308 or 310, hard disk drives 312, or the like, depending on which devices are within the powered element. Element control cards 308 and 310 receive normal communication data through primary communications 314 or redundant communications 316. While powered element 300 is depicted as a field replaceable unit, such as a serial attached SCSI hard disk drive (SAS HDD), storage enclosure, or the like, the illustrative embodiments are not limited to field replaceable units. That is, powered element 300 may be any type of powered element such as a storage subsystem, network device, server, switch, interconnect, or the like, with which power and current measurement system (PCMS) may operate without departing from the spirit and scope of the invention.

Redundant power controller 304 operates in a similar manner to primary power controller 302. Redundant power controller 304 receives power from a redundant power supply of a redundant power distribution device over redundant power line connection 318. Redundant power controller 304 then provides power to devices within powered element 300, such as element controller card 308 or 310, hard disk drives 312, or the like depending on which devices are within the powered element.

During normal operation, various components within powered element 300 utilize power from primary power controller 302 and/or redundant power controller 304. Thus, redundant power controller 304 continually monitors the functions performed by primary power controller 302. Likewise, primary power controller 302 continually monitors the functions performed by redundant controller 304. In the event the primary power source fails to deliver power via primary power line connection 306, primary power controller 302 ceases to function and for a predetermined amount of time, redundant power controller 304 becomes the sole provider of power to powered element 300. If primary power controller 302 resumes delivering power, powered element 300 resumes utilizing the power from primary power controller 302 as before the loss of the primary power source.

Figure 4:
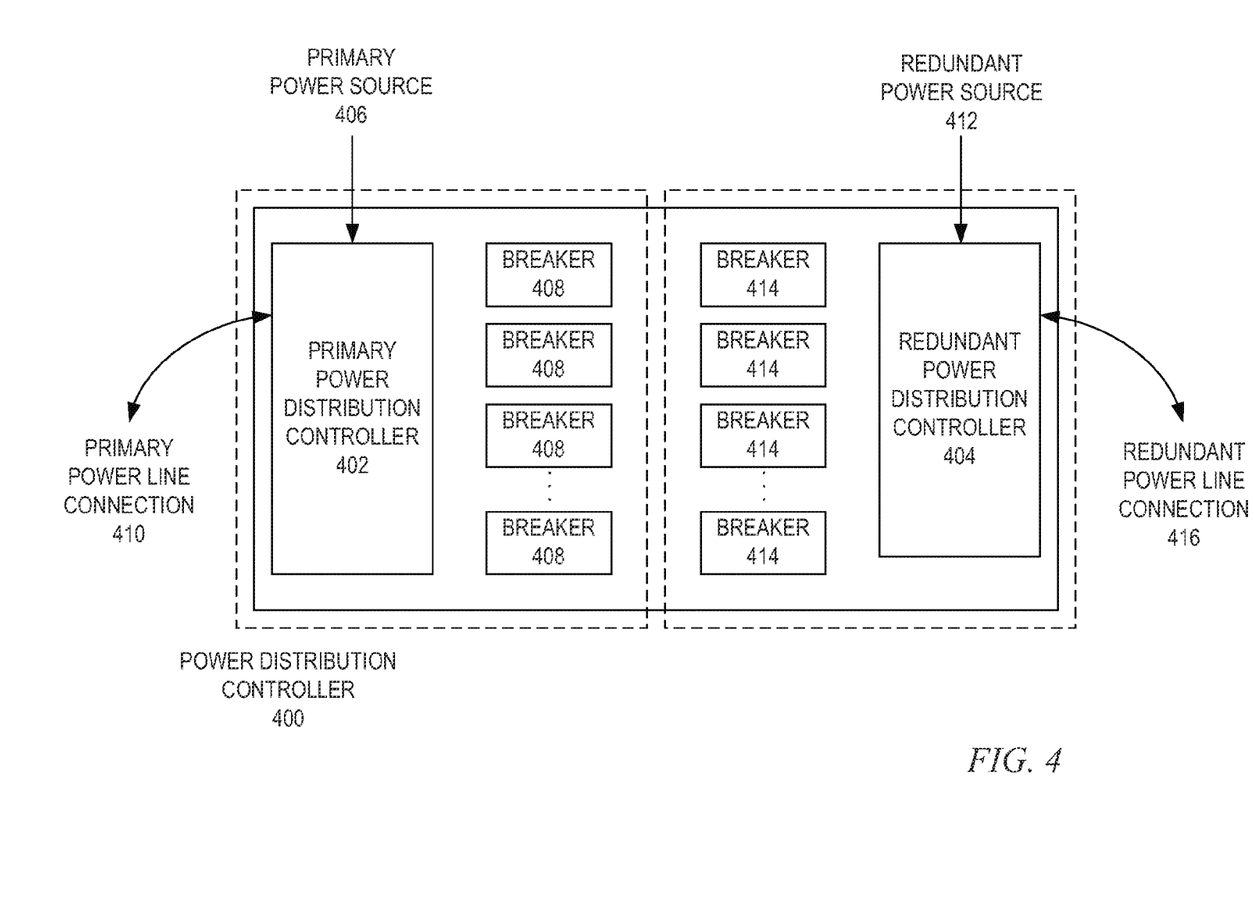
FIG. 4 depicts an exemplary power distribution device in accordance with an illustrative embodiment.

FIG. 4 depicts an exemplary power distribution device in accordance with an illustrative embodiment. Power distribution controller 400 includes primary power distribution controller 402 and redundant power distribution controller 404. Primary power distribution controller 402 receives power from primary power source 406. Primary power distribution controller 402 comprises a plurality of circuit breakers 408. Each of breakers 408 may provide primary power to a set of powered elements, such as powered element 300 of FIG. 3, via a separate primary power line connection 410. Redundant power distribution controller 404 receives power from redundant power source 412. Redundant power distribution controller 404 comprises a plurality of circuit breakers 414. Each of breakers 414 provides redundant power to the same set of powered elements, such as powered element 300 of FIG. 3, via a separate redundant power line connection 416.

If primary power source 406 fails to deliver power, primary power distribution controller 402 ceases to function and redundant power distribution controller 404 provides redundant power to powered elements through redundant power line connection 416. Likewise, if redundant power source 412 fails to deliver power, redundant power distribution controller 404 ceases to function and primary power distribution controller 402 provides primary power to powered elements through primary power line connection 410.

Figure 5:
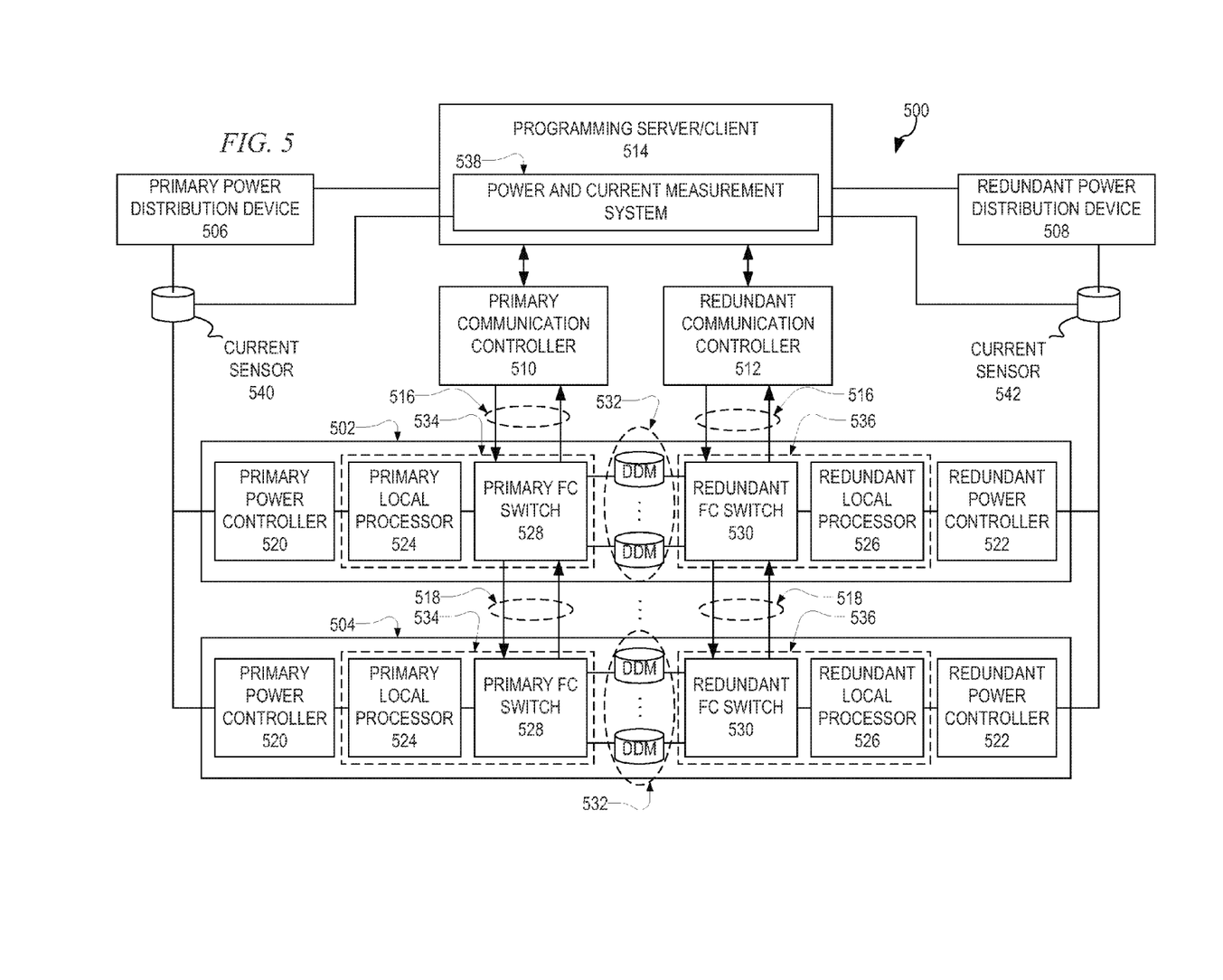
FIG. 5 illustrates an exemplary detailed configuration of powered elements in accordance with an illustrative embodiment.

FIG. 5 illustrates an exemplary detailed configuration of powered elements in accordance with an illustrative embodiment. Detailed configuration 500 depicts powered elements 502 and 504 connected to primary power distribution device 506, redundant power distribution device 508, primary communication controller 510, and redundant communication controller 512. Primary power distribution device 506, redundant power distribution device 508, primary communication controller 510, and redundant communication controller 512 may be separate devices or may be parts of a power distribution and communication controller. Powered elements 502 and 504 are powered elements similar to powered element 300 of FIG. 3, and primary power distribution device 506 and redundant power distribution device 508 are power distribution devices similar to primary power distribution controller 402 and redundant power distribution controller 404 of FIG. 4. While only powered elements 502 and 504 are depicted, any number of powered elements may be connected in a manner similar to powered elements 502 and 504. Primary communication controller 510 and redundant communication controller 512 are coupled to programming server/client 514 in order to receive and distribute communication data to powered elements 502 and 504.

Powered elements 502 and 504 may be individually connected to primary communication controller 510 and redundant communication controller 512 or, as depicted, powered element 502 may be directly connected to primary communication controller 510 and redundant communication controller 512 using connections 516 and powered element 504 may be connected to powered element 502 using connections 518 in a daisy-chain or loop configuration. Powered elements 502 and 504 each may include primary power controller 520, redundant power controller 522, primary local processor 524, redundant local processor 526, primary fibre channel (FC) switch 528, redundant FC switch 530, and numerous disk drive modules (DDMs) 532. Primary local processor 524, redundant local processor 526, primary fibre channel (FC) switch 528, and redundant FC switch 530 may be separate components or components within element control cards 534 and 536, respectively. Daisy-chaining the communication connections between primary communication controller 510 and primary FC switches 528, as well as between redundant communication controller 512 and redundant FC switches 530, may create a loop configuration, such as a FC loop, or the like.

During installation of a set of powered elements P, such as powered elements 502 and 504, power and current measurement system (PCMS) 538, which may be within programming server/client 514 (shown) or a separate unit coupled to programming server/client 514 (not shown), is programmed with a branch circuit rating and a circuit breaker rating for all powered elements fed by the particular branch circuit with which PCMS 538 is associated. PCMS 538 then determines the branch circuit current capacity based on the branch circuit rating and the circuit breaker rating. For example, if the set of powered elements P each have a cumulative peak wattage rating of 2700 watts per power controller operating with a branch circuit voltage rating of 120 volts, then the set of powered elements P would have an operation current that is calculated using Ohm's Law where Watts=Voltage*Amps, which in this case is 2700 watts/120 volts=22.5 amps. Since standard electrical circuit breaker sizes increase by 10 after the lowest 15 Amp (e.g. 20, 30, 40, etc.), then the powered elements would be installed with a 30 amp circuit breaker at primary power distribution device 506 and redundant power distribution device 508 to protect primary power controllers 520 and redundant power controllers 522, respectively.

If during operation, powered element 502 provides a power consumption for primary power controller 520 of 2100 watts and a power consumption for redundant power controller 522 of 2220 watts to PCMS 538, then PCMS 538 would determine a cumulative wattage rating of 4320 watts, Using Ohm's law, PCMS 538 determines that the cumulative amperage is 4320 watts/120 volts=36 amps, However, the maximum that either primary power controller 520 or redundant power controller 522 may handle is 80 percent of the 30 amp circuit breaker value which is 24 amps. Therefore, programming server/client 514 determines that in order for powered element 502 to operate using only primary power controller 520 or redundant power controller 522, then powered element 502 must reduce power consumption to 24 amps/36 amps=66 percent. While this example is described in terms of a powered element operating with a supplied single phase 120 volt circuit, the illustrative embodiments are not limited to these operational parameters. That is, one of ordinary skill in the art would recognized that powered elements may operate using a single phase voltage such as 120 volts, 277 volts, or the like, or the powered elements may operated using three phase voltages such as 240 volts, 480 volts, or the like, and similar power reduction power caps may be calculated without departing from the spirit and scope of the invention.

Thus, at initialization of the set of powered elements P fed by the particular branch circuit, PCMS 538 sets the power cap of each powered element p that has power capping capabilities to 66 percent of its maximum power rating. That is, not all powered elements in detailed configuration 500 may be powered capped and, thus, only powered elements P that may be powered capped are managed by PCMS 538. After initialization, PCMS 538 then measures in real time the total current being consumed in the primary and redundant branch circuits via current sensors 540 and 542. PCMS 538 then computes a new total power cap for a current time period (TPC(t)) based on current total power cap and measured current using a proportional-integral-derivative (PID) closed-loop control. In order to compute the TPC(t), PCMS 538 determines the current available on the branch circuit ($C_{ab}$) by subtracting the measured current at the branch circuit ($C_b$) from the 80 percent branch circuit capacity current value ($C_{b80}$), such that $C_{ab}=C_{b80}-C_b$. Then PCMS 538 calculates the TPC(t) using the equation:

$$TPC(t)=PID(TPC(t-1)),Cab$$

where the (TPC(t−1)) is the total power cap for the previous time period.

Once the TPC(t) is determined, PCMS 538 determines whether the calculated TPC(t) is less than 125 percent of the branch circuit capacity in order to not cause a branch circuit fault. If the calculated TPC(t) is greater than 125 percent of the branch circuit capacity, PCMS 538 adjusts the calculated TPC(t) to be less than 125 percent. If the calculated TPC(t) is less than 125 percent or if PCMS 538 adjust the calculated TPC(t) to be less than 125 percent, PCMS 538 determines a difference in the total power caps (ΔTPC) by subtracting the TPC(t−1) from the TPC(t), such that ΔTPC=TPC(t)−TPC(t−1). Then for each powered element p in the set of powered elements P at the current time period t, PCMS 538 determines a new power cap using the equation:

$$(PC(p,t))=PC(p,t-1)+(\Delta TPC/P)$$

Once each new power cap is determined, PCMS 538 sets the power cap of each powered element p to the new power cap. Thus, PCMS 538 distributes the difference of the total power caps in proportion to the initial power cap of the set of powered elements P. PCMS 538 may update the power cap for each powered element using, for example, operating system level management applications, service processors, or the like, over, for example, an information technology network, a power line communications system, or the like.

Thus, if the set of powered elements P included six powered elements with a maximum power rating of 6 amps, PCMS 538 would set each of the powered elements to an initial power cap of 66% or 4 amps. If during operation, two of the powered elements become idle and only consume 3 amps, then the unused 2 amps becomes available to be distributed amongst the six powered elements without violating the branch circuit capacity of the branch circuit. That is, the power caps for the six powered elements may be increased to 4.5 amps, such that the two powered elements that are idle will continue to use 3 amps and the other four powered elements may use up to the 4.5 amps. Such a power cap increase would result in the total current usage remaining at or below the 80 percent branch circuit capacity of 24 amps. Thus, the power cap set by PCMS 538 during normal operation may be larger or equal to a default power cap to 66 percent of maximum power rating of the powered element in the event of the powered element fails to receive a periodic power cap update from PCMS 538 within a predetermined time interval as well as never allocating power caps that together use more than 125 percent of the branch circuit capacity (BCC). Further, while PCMS 538 is depicted as a single unit, PCMS 538 may be two or more PCMSs with redundancy so that when one PCMS fails another PCMS may take over for the failed PCMS.

As will be appreciated by one skilled in the art, the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

Figure 6:
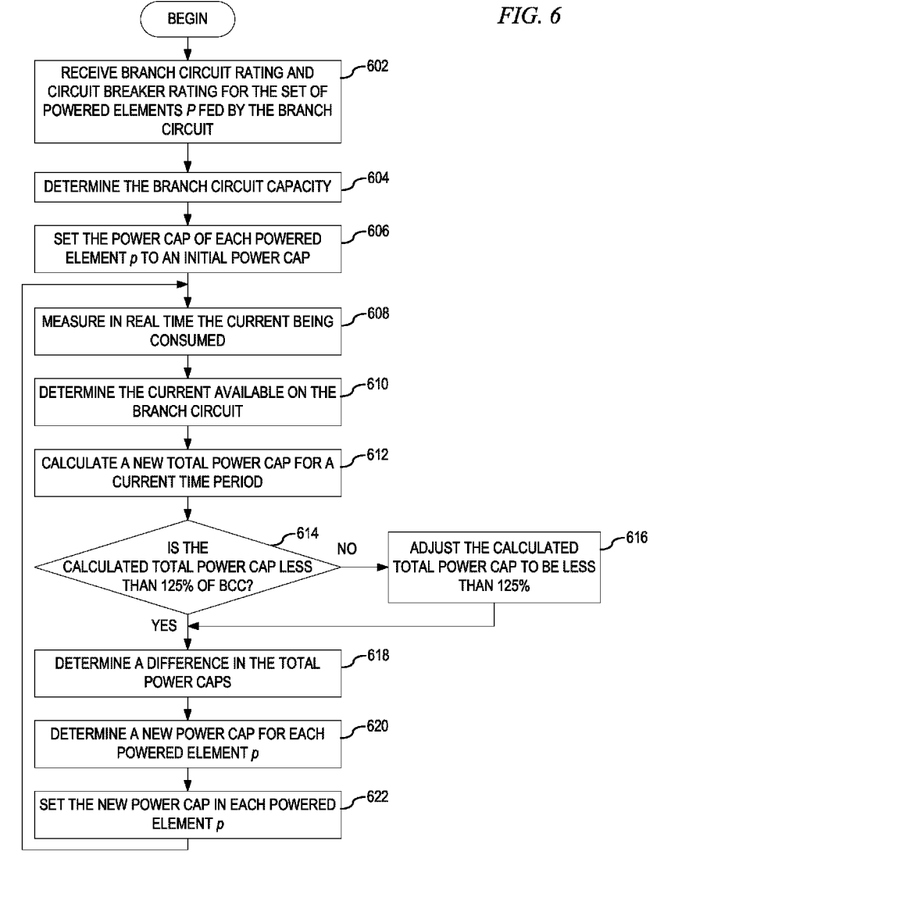
FIG. 6 depicts an exemplary flowchart of the operation performed by an power and current measurement system (PCMS) in accordance with the illustrative embodiment.

FIG. 6 depicts an exemplary flowchart of the operation performed by an power and current measurement system (PCMS) in accordance with the illustrative embodiment. As the operation begins, the PCMS receives a branch circuit rating and a circuit breaker rating for all powered elements fed by the particular branch circuit with which the PCMS is associated (step 602). The PCMS determines the branch circuit capacity based on the branch circuit rating and the circuit breaker rating (step 604). At initialization of a set of powered elements P fed by the particular branch circuit, the PCMS sets the power cap of each powered element p to an initial power cap based on the branch circuit capacity (step 606).

After initialization, the PCMS measures in real time the current being consumed in the primary and redundant branch circuits via current sensors coupled to the primary and redundant branch circuits (step 608). The PCMS then determines the current available on the branch circuit ($C_{ab}$) by subtracting the measured current at the branch circuit ($C_b$) from the 80 percent branch circuit capacity current value ($C_{b80}$), such that $C_{ab}=C_{b80}-C_b$ (step 610). The PCMS then calculates a new total power cap for a current time period (TPC(t)) based on current total power cap and measured current using a PID closed-loop control (step 612) using the equation:

$$TPC(t)=PID(TPC(t-1)),Cab)$$

where the (TPC(t−1)) is the total power cap for the previous time period.

Once the TPC(t) is determined, the PCMS determines whether the calculated TPC(t) is less than 125 percent of the branch circuit capacity in order to not cause a branch circuit fault (step 614). If at step 614 the calculated TPC(t) is greater than 125 percent of the branch circuit capacity, the PCMS adjusts the calculated TPC(t) to be less than 125 percent (step 616). If at step 614 the calculated TPC(t) is less than 125 percent or from step 616 where the PCMS adjusted the calculated TPC(t) to be less than 125 percent, the PCMS determines a difference in the total power caps (ΔTPC) by subtracting the TPC(t−1) from the TPC(t), such that ΔTPC=TPC(t)−TPC(t−1) (step 618).

Then for each powered element p in the set of powered elements P at the current time period t, the PCMS determines a new power cap (step 620) using the equation:

$$(PC(p,t)) = PC(p, t-1) + (\Delta TPC/P)$$

Once each new power cap is determined, the PCMS sets the power cap of each powered element p to the new power cap (step 622), with the operation retuning to step 608 thereafter.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the illustrative embodiments provide mechanisms for dynamically changing power caps of powered elements so the average current consumed for the servers is at most 80 percent of the branch circuit current (BCC) associated with the powered elements. A power and current measurement system (PCMS) uses the real-time current measurement in each branch circuit to compute new power caps for the powered elements associated with that branch circuit. The PCMS updates the power cap for each powered element using, for example, operating system level management applications, service processors, or the like, over, for example, an information technology network, a power line communications system, or the like. The illustrative embodiments may be fault-tolerant to a PCMS failure by defaulting a powered element to a power cap to 66 percent of maximum power in the event of the powered element failing to receive a periodic power cap update within a predetermined time interval as well as never allocating power caps that together use more than 125 percent of the branch circuit capacity (BCC).

As noted above, it should be appreciated that the illustrative embodiments may take the form of an entirety hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for dynamically changing power caps for a set of powered elements, the method comprising:
   measuring current being consumed by the set of powered elements P on a branch circuit;
   determining available current on the branch circuit;
   identifying a new total power cap for a current time period t based on a current total power cap and the measured current;
   determining a difference in total power caps ($\Delta TPC$);
   for each powered element p in the set of powered elements P at the current period, determining a new power cap PC (p,t) based on the previous power cap PC(p,t-1) and the difference of the total power caps to the set of powered elements P; and
   dynamically setting a power cap of each powered element p to the new power cap PC (p,t).

2. The method of claim 1, wherein the available current on the branch circuit is determined by subtracting the measured current on the branch circuit from a branch circuit capacity current value.

3. The method of claim 1, wherein the power cap of each powered element p is set in response to a failure in at least one of a primary power controller or a redundant power controller.

4. The method of claim 1, wherein identifying the new total power cap for the current time period based on the current total power cap and the measured current uses a proportional-integral-derivative (PID) closed-loop control.

5. The method of claim 1, wherein the difference in total power caps is determined by subtracting the current total power cap from the new total power cap.

6. The method of claim 1, wherein the new power cap PC (p,t) is determined using:

$$(PC(p,t) = PC(p, t-1) + (\Delta TPC/P).$$

7. The method of claim 1, wherein the power cap of each powered element p is set to the new power cap PC (p,t) via at least one of an operating system level management application or a service processor.

8. The method of claim 1, wherein the power cap of each powered element p is set to the new power cap PC (p,t) and communicated over at least one of an information technology network or a power line communications system.

9. The method of claim 1, wherein, responsive to a power and current measurement system (PCMB) failure, the power cap of each powered element p is set to a percentage of a maximum power setting of the powered element.

10. The method of claim 9, wherein the percentage of the maximum power setting of the powered element is 66 percent.

11. A computer program product comprising a non-transitory computer readable storage medium having a computer readable program stored therein, wherein the computer readable program, when executed on a computing device, causes the computing device to:
  measure current being consumed by a set of powered elements P on a branch circuit;
  determine available current on the branch circuit;
  identify a new total power cap for a current time period t based on a current total power cap and the measured current;
  determine a difference in total power caps (ΔTPC);
  for each powered element p in the set of powered elements P at the current time period, determine a new power cap PC (p,t) based on the previous power cap PC(p,t−1) and the difference of the total power caps to the set of powered elements P; and
  dynamically set a power cap of each powered element p to the new power cap PC (p,t).

12. The computer program product of claim 11, wherein the available current on the branch circuit is determined by subtracting the measured current on the branch circuit from a branch circuit capacity current value.

13. The computer program product of claim 11, wherein the power cap each powered element p is set in response to a failure in at least one of a primary power controller or a redundant power controller.

14. The computer program product of claim 11, wherein identifying the new total power cap for the current time period based on the current total power cap and the measured current uses a proportional-integral-derivative (PID) closed-loop control.

15. The computer program product of claim 11, wherein the difference in total power caps is determined by subtracting the current total power cap from the new total power cap.

16. The computer program product of claim 11, wherein the new power cap PC (p,t) is determined using:

$$(PC(p,t))=PC(p,t-1)+(\Delta TCP/P).$$

17. The computer program product of claim 11, wherein the power cap of each powered element p is set to the new power cap PC (p,t) via at least one of an operating system level management application or a service processor.

18. An apparatus, comprising:
  a processor; and
  a memory coupled to the processor, wherein the memory comprises instructions which, when executed by the processor, cause the processor to:
  measure current being consumed by a set of powered elements P on a branch circuit;
  determine available current on the branch circuit;
  identify a new total power cap for a current time period t based on a current total power cap and the measured current;
  determine a difference in total power caps (ΔTPC);
  for each powered element p in the set of powered elements P at the current time period, determine a new power cap PC (p,t) based on the previous power cap PC(p,t−1) and the difference of the total power caps to the set of powered elements P; and
  dynamically set a power cap of each powered element p to the new power cap PC (p,t).

19. The apparatus of claim 18, wherein the available current on the branch circuit is determined by subtracting the measured current on the branch circuit from a branch circuit capacity current value.

20. The apparatus of claim 18, wherein the power cap of each powered element p is set in response to a failure in at least one of a primary power controller or a redundant power controller.

21. The apparatus of claim 18, wherein identifying the new total power cap for the current time period based on the current total power cap and the measured current uses a proportional-integral-derivative (PID) closed-loop control.

22. The apparatus of claim 18, wherein the difference in total power caps is determined by subtracting the current total power cap from the new total power cap.

23. The apparatus of claim 18, wherein the new power cap PC (p,t) is determined using:

$$(PC(p,t))=PC(p,t-1)+(\Delta TPC/P).$$

24. The apparatus of claim 18, wherein the power cap of each powered element p is set to the new power cap PC (p,t) via at least one of an operating system level management application or a service processor.

* * * * *